(12) United States Patent
Scrivens et al.

(10) Patent No.: US 6,728,518 B1
(45) Date of Patent: Apr. 27, 2004

(54) EVENT COMMUNICATION SYSTEM

(76) Inventors: Dean Scrivens, 6107-55 Ave., Ponoka, Alberta (CA), T4J 1L2; Neil Christiansen, RR2, Blufton, Alberta (CA), T4J 0M0

( * ) Notice: Subject to any disclaimer, the term of this patent is extended or adjusted under 35 U.S.C. 154(b) by 0 days.

(21) Appl. No.: 09/089,733

(22) Filed: Jun. 3, 1998

(51) Int. Cl.⁷ .................................................. H04B 1/38
(52) U.S. Cl. .................... 455/90.2; 455/347; D14/138
(58) Field of Search ................................ 455/350, 575, 455/205, 347, 90.1, 90.2, 90.3, 412, 42, 66.1, 343.1, 351; 382/284, 275; D14/248, 138

(56) References Cited

U.S. PATENT DOCUMENTS

| | | | | |
|---|---|---|---|---|
| 4,084,139 A | * | 4/1978 | Jakobe | 455/205 |
| D291,990 S | * | 9/1987 | Lee | D14/143 |
| 4,872,854 A | * | 10/1989 | Hesu | 439/577 |
| 5,152,003 A | * | 9/1992 | Poch | 455/66 |
| 5,161,250 A | * | 11/1992 | Ianna et al. | 455/66 |
| 5,265,264 A | * | 11/1993 | Dzung et al. | 455/90 |
| 5,438,702 A | * | 8/1995 | Jackson | 455/89 |
| 5,508,695 A | * | 4/1996 | Nelson et al. | 340/323 R |
| 5,513,384 A | * | 4/1996 | Brennan et al. | 455/66 |
| 5,549,940 A | * | 8/1996 | Noone | 206/579 |
| 5,606,743 A | * | 2/1997 | Vogt et al. | 455/347 |
| D382,275 S | * | 8/1997 | Bentley et al. | D14/198 |
| 5,666,658 A | * | 9/1997 | Borchardt et al. | 455/42 |
| 5,734,964 A | * | 3/1998 | Fishman et al. | 455/42 |
| 5,790,946 A | * | 8/1998 | Rotzoll | 455/343 |
| 5,909,653 A | * | 6/1999 | Imura et al. | 455/575 |
| 5,930,405 A | * | 7/1999 | Chida | 382/284 |
| 5,953,656 A | * | 9/1999 | Bertocci | 455/412 |
| 5,959,290 A | * | 9/1999 | Schweid et al. | 382/275 |
| 6,064,860 A | * | 5/2000 | Ogden | 381/80 |

* cited by examiner

*Primary Examiner*—Quochien B. Vuong
(74) *Attorney, Agent, or Firm*—Terrence N. Kuharchuk; Rodman & Rodman

(57) ABSTRACT

A system for receiving a radio signal broadcast for a specific event such as a sporting contest, music concert, or other event attended by multiple persons. A portable base having a clip is attached to a fixed frequency receiver for detecting a broadcast radio signal, and a speaker for generating an audible signal can be attached to the base or to a portable speaker. The receiver can be activated by a manual switch or by a broadcast activation signal. The base has a substantially flat surface for displaying printed images, and a perimeter edge for the base can have a recognizable shape. The system includes a transmitter for broadcasting the signal, and a code mechanism can prevent unauthorized receipt of the broadcast signal.

2 Claims, 1 Drawing Sheet

EVENT COMMUNICATION SYSTEM

BACKGROUND OF THE INVENTION

The present invention relates to the field of radio transmission for special events such as sports contests and exhibitions. More particularly, the present invention relates to a portable, fixed frequency receiver for receiving a signal broadcast for a specific special event.

Radio stations broadcast commentary and other programming for special events such as hockey games and other sporting contests, concerts, festivals, and other gatherings attracting large crowds. Spectators at such events typically carry portable radios for receiving the broadcast signal so that the radio commentary and programming can be detected simultaneously with the spectator's perception of the event activities. Conventional radios are bulky and can be tuned to different frequencies which can cause interference with the event broadcast radio signal and which can create distractions for adjacent spectators. Such distractions have caused crowd disturbances leading to the prohibition of radios at certain events.

Conventional radios are typically banned from concerts and other artistic productions because of the awareness that such radios typically include recording equipment capable of creating bootleg audio recordings of the event. Security personnel screen for the unauthorized entry of radios as the spectators enter the performance venues, leading to confrontations at the gate.

Wireless radio transmissions are used at conventions and other events to broadcast music and language interpretations to attendants speaking different languages. Although the radio receivers detecting such broadcast signals are relatively compact, such receivers are tunable so that the frequency of the broadcast signal can be adjusted. This feature significantly increases the receiver cost and creates problems for the user if the tuning control is not accurately adjusted to the desired frequency. Additionally, such systems can experience significant signal interference due to the multitude of frequencies broadcast within the permitted bandwidth.

There is, therefore, a need for an improved system capable of communicating a broadcast signal to spectators at special events. The system should reliably receive the signal, should avoid the problems experienced by event sponsors, and should not interfere with other event activities.

SUMMARY OF THE INVENTION

The present invention provides an apparatus and system for receiving a radio signal broadcast for a specific event. The apparatus comprises a portable base, a clip attached to the base, a fixed frequency receiver attached to the base which is capable of detecting the broadcast radio signal and of generating an amplified electrical signal. A means for providing electrical power to the receiver can comprise a battery or solar panel, and a speaker receives the electrical signal and generates an audible signal. The base can have a surface for displaying printed images, and a perimeter edge around such surface can have a recognizable shape.

The system of the invention comprises a transmitter for broadcasting the radio signal, a portable base, a clip attached to the base, a fixed frequency receiver, a means for providing electrical power to the receiver, and a speaker for receiving the electrical signal and for generating an audible signal. A code means can secure the radio broadcast between the transmitter and the base, and the transmitter can generate a signal capable of activating and deactivating the fixed frequency receiver.

DESCRIPTION OF THE PREFERRED EMBODIMENTS

Figure 1:
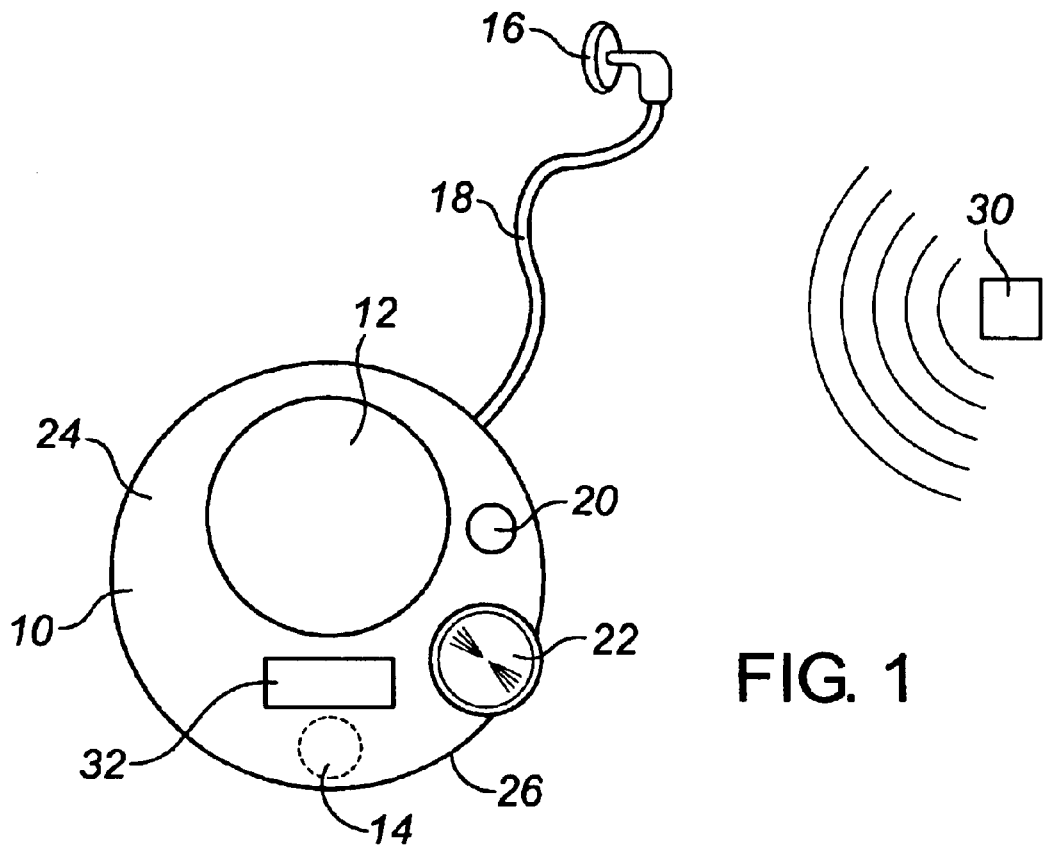
FIG. 1 illustrates an elevation view of the invention in a case having the form of a hockey puck.

The invention uniquely provides a fixed frequency receiver for detecting a radio signal broadcast for a specific event. Referring to FIG. 1, portable base 10 is attached to receiver 12, battery 14 and speaker 16. Wire 18 connects speaker 16 to base 10 and can be eliminated if speaker 16 is integrated into base 10. Wire 18 comprises an antenna wire for receiving a broadcast radio signal, and communicates such signal to receiver 12. In other embodiments of the invention, wire 18 can be integrated within receiver 12 or base 10 or can be replaced by electronic circuitry.

Figure 2:
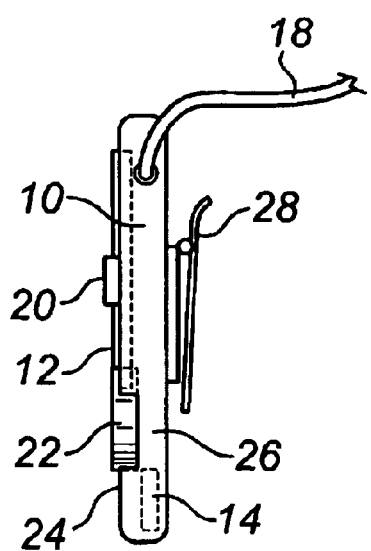
FIG. 2 illustrates a side elevation view of the invention.

Switch 20 can be connected between battery 14 and receiver 12 to provide for manual activation or deactivation of electrical power. In another embodiment of the invention, receiver 12 can include electronic circuitry providing on/off switching functionality based on a coded signal within the broadcast radio signal. Volume control 22 can be constructed with a rotating control as illustrated in FIG. 1 or with a digital control switch:

Base 10 has a substantially flat surface 24 as illustrated in FIGS. 1 and 2 for permitting the display of printed images. As used herein, the term "printed image" can comprise colored print, etchings, holograms, formed shapes, labels, imprinted designs or patterns, electronic word messages, or any other type of visual form or representation. Perimeter edge 26 of surface 24 can be formed in a recognizable shape to communicate identity with a particular object or entity. As shown in FIGS. 1 and 2, perimeter edge 26 is shaped in the cylindrical form of a hockey puck having a circular profile symmetric around an axis substantially perpendicular to surface 24. In other embodiments of the invention, perimeter edge 26 can be irregularly shaped or formed in a recognizable or nonrecognizable shape to provide the functional identification with the specific event correlating to the broadcast radio signal.

The printed image can comprise advertising, team logos, company brands, performer's identities, graphic patterns, or spectator identification. For sporting events, the printed image can provide identification of the spectator to a particular team or other identified role. The printed image uniquely provides identity to the fixed frequency broadcast radio signal, providing simulcast functionality and connection between the signal and each spectator carrying a portable base and receiver.

The printed image on surface 24 and a recognizable shaped provided by perimeter edge 26 are easily adapted to numerous special events. Without limiting the scope of different events application to the invention, representative event subjects, printed images and recognizable shapes or combinations thereof can include baseballs, bats, helmets, or gloves for baseball events; footballs, helmets, or player silhouettes for football; basketballs, high top runners, and backboards for basketball; pucks, sticks, skates or nets for hockey; soccer balls or field for soccer; rings or torch for the Olympics; car profiles, racing helmets or checkered flags for formula one racing; stock car profiles, for Nascar racing;

funny car profiles, racing helmets and checker flags for top fuel or dragster racing; horses or jockey profiles for horse racing; balls, clubs, bags, or tees for golf; player profiles or balls for rugby or Australian rules rugby; player profiles, balls, or rackets for tennis; runner profiles, shoes or accessories for track and field events; player or horse profiles or balls for polo events; bull and rider profiles, horse and rider profiles, or rodeo clown profiles for rodeo events; muscle man or woman profiles or weights for weight lifting events; skier profiles, skiis, snowboards, or mountain profiles for skiing events; and cricket pads or paddles and balls for cricket events.

As shown in FIG. 2, clip 28 can comprise a spring loaded clip suitable for attaching base 10 to an article of clothing, a badge, a chain, or other device for controlling the portability of base 10. As used herein, the term "clip" includes snaps, hooks, eyelets for engagement with chains or wires, clasps, Velcro strips, and any other material or configuration sufficient for permanently or temporarily retaining base 10 in proximity to a spectator.

Battery 14 can comprise a button cell battery or other configuration of conventional stored power supply. In different embodiments of the invention, a solar panel or cell can be substituted for battery 14 to provide electrical power to receiver 12.

Transmitter 30 provides a broadcast radio signal related to the specific event, and is particularly designed for the venue occupied by the event. In other embodiments of the invention, transmitter 30 can transmit a sufficiently strong signal to be received by receivers 12 remote from the event site. In one embodiment of the invention, transmitter 30 and receiver 12 can incorporate a code mechanism or means for preventing interception of the broadcast radio signal. Transmitter 30 can also be programmed to deliver an activation signal detectable by receiver 12 to selectively activate or to deactivate receiver 12 or the power supply furnishing electricity to receiver 12.

Receiver 12 can be tuned to AM or FM frequency ranges or to other frequencies suitable for transmission and receipt. By making receiver 12 a single, fixed frequency device, receiver 12 can be pre-tuned during manufacture to reduce manufacturing costs and to reduce errors in the system. By avoiding multiple frequencies, receiver 12 substantially eliminates problems due to interference, inaccurate operation, mechanism failure, and other reliability issues.

Surface 24 can have a lighted display such as an LED display 32 which identifies the source of the radio signal, the name of the specific team or event, or a broadcast message. For example, the broadcast message can provide player statistics in a sporting event utilization, the game score, historical information, or cheers to be simultaneously or sequentially communicated to event spectators or participants. This unique communication feature of the system enhances the interactive function of the invention by integrating the spectators into the event as participants.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus engagable with a user for receiving a broadcast radio signal for a specific event, comprising:

(a) a substantially flat, portable base having a surface suitable for displaying a printed image and defining a perimeter edge, wherein the perimeter edge is formed in a recognizable shape to associate the apparatus with the specific event;

(b) a printed image on the surface of the base, wherein the printed image provides identifying information to associate the apparatus with the specific event;

(c) a clip attached to the base for engaging the base with the user at a selected position proximate to the user;

(d) a fixed frequency receiver attached to the base, wherein the receiver is capable of detecting the broadcast radio signal and of generating an amplified electrical signal;

(e) a replaceable battery engaged with the receiver for providing electrical power to the receiver;

(f) a switch for selectively disconnecting the battery from the receiver; and (g) a speaker for receiving the electrical signal and for generating an audible signal.

2. The apparatus as claimed in claim 1 wherein the base is comprised of a lighted display which displays a visual broadcast message derived from the broadcast radio signal.

* * * * *